US011241782B1

(12) United States Patent
Esfahanian et al.

(10) Patent No.: US 11,241,782 B1
(45) Date of Patent: Feb. 8, 2022

(54) INTERCHANGEABLE TOOL BIT HOLDER

(71) Applicant: PICQUIC TOOL COMPANY INC., Vancouver (CA)

(72) Inventors: Ehsan Esfahanian, North Vancouver (CA); Paul Donald McKenzie, West Vancouver (CA)

(73) Assignee: PICQUIC TOOL COMPANY INC., Vancouver (CA)

( * ) Notice: Subject to any disclaimer, the term of this patent is extended or adjusted under 35 U.S.C. 154(b) by 0 days.

(21) Appl. No.: 17/487,402

(22) Filed: Sep. 28, 2021

(51) Int. Cl.
*B25G 1/08* (2006.01)
*B23B 31/00* (2006.01)
*B25B 23/00* (2006.01)

(52) U.S. Cl.
CPC ............ *B25G 1/085* (2013.01); *B23B 31/005* (2013.01); *B25B 23/0035* (2013.01)

(58) Field of Classification Search
CPC ... B25G 1/085; B23B 31/005; B25B 23/0035; B25B 23/0042; B25B 15/02
See application file for complete search history.

(56) References Cited

U.S. PATENT DOCUMENTS

| 5,335,409 | A | 8/1994 | Elvebak |
| 5,592,862 | A | 1/1997 | Macor |
| 5,638,727 | A | 6/1997 | Gringer |
| 6,279,434 | B1 | 8/2001 | Brown |
| 7,111,533 | B1 | 9/2006 | Ran |
| 9,457,460 | B2 | 10/2016 | Hermansen et al. |
| 2007/0180958 | A1 | 8/2007 | Andronica et al. |
| 2018/0043516 | A1* | 2/2018 | Zhang .................... B25B 15/02 |
| 2018/0229357 | A1* | 8/2018 | Parker .................... B25G 1/085 |
| 2018/0281166 | A1 | 10/2018 | Chmelar |

FOREIGN PATENT DOCUMENTS

| GB | 2219539 B | 8/1992 |
| WO | 2009008711 A2 | 1/2009 |

* cited by examiner

*Primary Examiner* — David B. Thomas
(74) *Attorney, Agent, or Firm* — Kolitch Romano LLP

(57) ABSTRACT

An apparatus for holding interchangeable tool bits includes a body including inner walls defining first and second bit holding spaces configured to receive first and second interchangeable tool bits, a resiliently deformable bit holder coupled to the body and separating the first and second bit holding spaces, the first bit holding space adjacent to and encircled by an inner surface region of the resiliently deformable bit holder and the second bit holding space adjacent to an outer surface region of the resiliently deformable bit holder, such that the inner surface region and the outer surface region of the resiliently deformable bit holder are configured to deform against the first and second interchangeable tool bits respectively, to hold the first and second interchangeable tool bits when the first and second interchangeable tool bits are in the first and second bit holding spaces. Other apparatuses and systems are disclosed.

20 Claims, 18 Drawing Sheets

INTERCHANGEABLE TOOL BIT HOLDER

BACKGROUND

1. Field

Embodiments of this disclosure relate to interchangeable tool bits and more particularly to holding interchangeable tool bits.

2. Description of Related Art

Some known devices for holding interchangeable tool bits may include tool bit holders configured to hold tool bits. In some devices, the tool bits may be switched in and out of a driving bit holder. However, some such known devices may not be configured for efficient and/or effective use. For example, some known devices may not be configured for efficient space use within the device for holding the tool bits and/or some such known devices may include many different parts and/or may not efficiently use the parts included in the device.

SUMMARY

In accordance with various embodiments, there is provided an apparatus for holding interchangeable tool bits, the apparatus including a body including inner walls defining first and second bit holding spaces configured to receive first and second interchangeable tool bits, a resiliently deformable bit holder coupled to the body and separating the first and second bit holding spaces, the first bit holding space adjacent to and encircled by an inner surface region of the resiliently deformable bit holder and the second bit holding space adjacent to an outer surface region of the resiliently deformable bit holder, such that the inner surface region and the outer surface region of the resiliently deformable bit holder are configured to deform against the first and second interchangeable tool bits respectively, to hold the first and second interchangeable tool bits when the first and second interchangeable tool bits are in the first and second bit holding spaces.

The inner walls of the body may include at least one planar wall adjacent to the second bit holding space, the at least one planar wall configured to engage and align with at least one flat side of the second interchangeable tool bit when the second interchangeable tool bit is in the second bit holding space.

The at least one planar wall may include a first planar wall opposite the outer surface region of the resiliently deformable bit holder across the second bit holding space.

The at least one planar wall may include second and third generally planar walls adjacent to the second bit holding space, each of the second and third generally planar walls extending from the first planar wall at an angle of about 120 degrees.

The inner walls of the body may define a bit holding cavity having the first and second bit holding spaces and the resiliently deformable bit holder may be held in the bit holding cavity.

The inner walls of the body may define a third bit holding space configured to receive a third interchangeable tool bit, the outer surface region of the resiliently deformable bit holder may be a first outer surface region, and the resiliently deformable bit holder may separate the first and third bit holding spaces, the third bit holding space adjacent to a second outer surface region of the resiliently deformable bit holder, such that the second outer surface region of the resiliently deformable bit holder is configured to deform against the third interchangeable tool bit to hold the third interchangeable tool bit in the third bit holding space.

The second and third bit holding spaces may be disposed on opposite sides of the resiliently deformable bit holder.

The inner walls of the body may define a bit holding cavity having the first, second, and third bit holding spaces and the resiliently deformable bit holder may be held in the bit holding cavity.

The apparatus may include the third interchangeable tool bit held in the third bit holding space.

The apparatus may include a holder mount configured to couple the resiliently deformable bit holder to the body, the holder mount including walls defining a first opening configured to receive and hold a first end of the resiliently deformable bit holder.

The holder mount may include walls defining a second opening configured to receive and hold a second end of the resiliently deformable bit holder, the second end opposite the first end of the resiliently deformable bit holder.

The holder mount may be integral with the body.

The resiliently deformable bit holder may include an o-ring.

The apparatus may include a driving bit holder configured to receive and hold a driving interchangeable tool bit, such that the driving interchangeable tool bit is driveable by rotation of the body when the driving interchangeable tool bit is held by the driving bit holder.

The resiliently deformable bit holder may be a first resiliently deformable bit holder and the driving bit holder may include inner walls that define a driving bit holding space, the inner walls configured to hold and rotationally lock the driving interchangeable tool bit in the driving bit holding space, and a second resiliently deformable bit holder configured to deform against and hold the driving interchangeable tool bit when the driving interchangeable tool bit is held by the driving bit holder.

The driving bit holding space may be generally axially aligned with the first bit holding space.

The driving bit holding space is adjacent to and encircled by an inner surface region of the second resiliently deformable bit holder and the inner walls of the body may define a transition bit holding space extending from the second bit holding space, the transition bit holding space adjacent to an outer surface region of the second resiliently deformable bit holder, such that the inner surface region and the outer surface region of the second resiliently deformable bit holder are configured to deform against the driving interchangeable tool bit and a transition interchangeable tool bit respectively, to hold the driving interchangeable tool bit and the transition interchangeable tool bit when the driving interchangeable tool bit and the transition interchangeable tool bit are in the driving bit holding space and the transition bit holding space respectively.

The first and second resiliently deformable bit holders may have generally similar dimensions.

The apparatus may include the driving interchangeable tool bit held by the driving bit holder.

The apparatus may include the first and second interchangeable tool bits held in the first and second bit holding spaces respectively.

Other aspects and features of embodiments of the present disclosure will become apparent to those ordinarily skilled in the art upon review of the following description of specific embodiments of the present disclosure in conjunction with the accompanying figures.

BRIEF DESCRIPTION OF THE DRAWINGS

In drawings which illustrate embodiments of the present disclosure.

DETAILED DESCRIPTION

Figure 1:
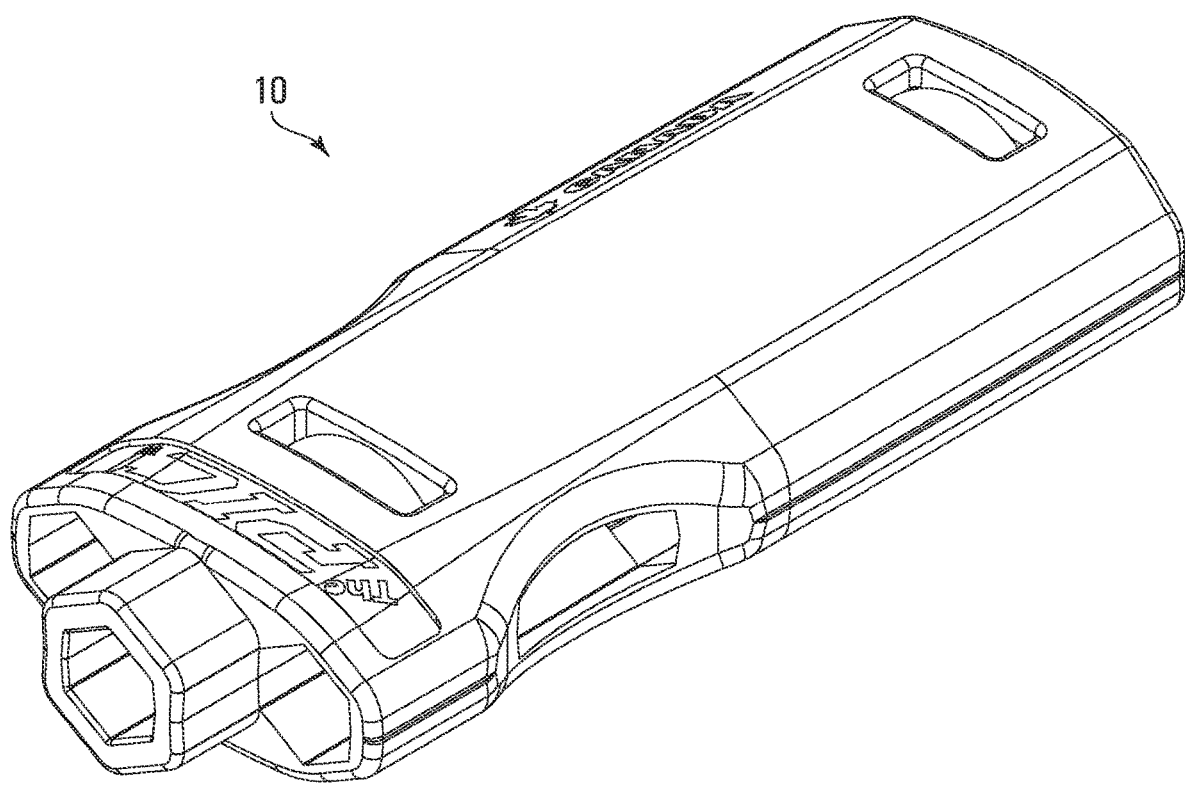
FIG. 1 is a first perspective view of an apparatus for holding interchangeable tool bits according to various embodiments.

Referring to FIG. 1, there is shown a first perspective view of an apparatus 10 for holding interchangeable tool bits, according to various embodiments. In various embodiments, the apparatus 10 may facilitate holding of interchangeable tool bits with efficient use of space, economy of materials, ease of use, and/or ease of manufacturing. In some embodiments, for example, the interchangeable tool bits may include screwdriver bits. In some embodiments, the apparatus 10 may be configured to hold an interchangeable tool bit for use. For example, in some embodiments, the apparatus 10 may be configured to hold a screwdriver bit for use and to act as a screwdriver for driving the held screwdriver bit. In various embodiments, the apparatus 10 being configured to hold bits for both later use and current use may facilitate ease of changing of the bits by a user.

Referring to FIGS. 2, 3, 4, 5, and 6, there is shown a second perspective view, a side view, a top view, a front view, and a rear view of the apparatus 10 of FIG. 1 in accordance with various embodiments. Referring to the side view shown in FIG. 3, there is shown at 7, a depiction of a cross-section from which a top sectional view shown in FIG. 7 and a perspective sectional view shown in FIG. 8 of the apparatus 10 are taken, according to various embodiments. In various embodiments, the apparatus 10 may be generally symmetric across the section plane 7 shown in FIG. 3.

Figure 7:
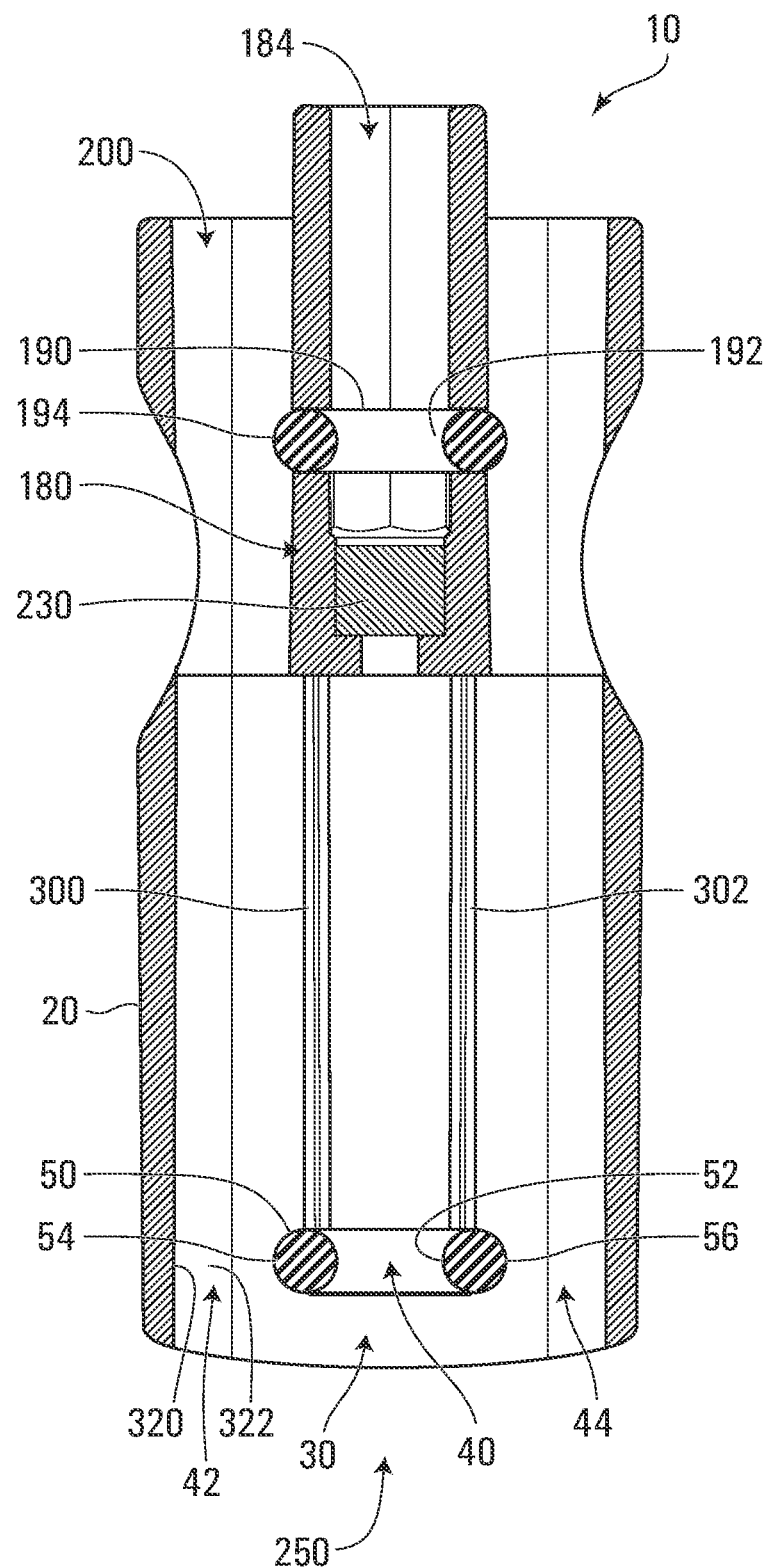
FIG. 7 is a top sectional view of the apparatus shown in FIG. 1 according to various embodiments.
Figure 8:
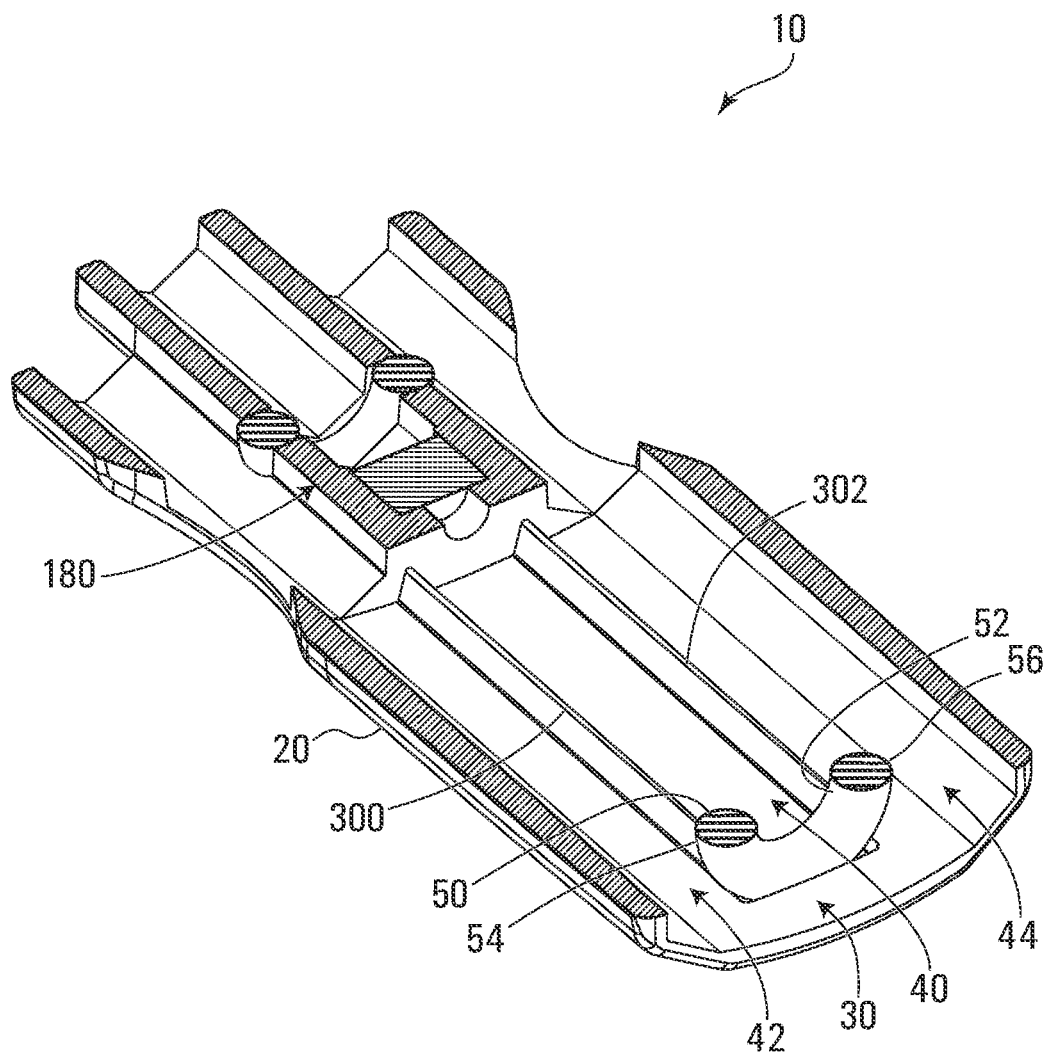
FIG. 8 is a perspective sectional view of the apparatus shown in FIG. 1 according to various embodiments.

Referring to FIGS. 7 and 8, in various embodiments, the apparatus 10 may include a body 20 including inner walls or surfaces defining first and second bit holding spaces 40 and 42 configured to receive first and second interchangeable tool bits. In various embodiments, the inner walls of the body 20 may define a bit holding cavity 30 having the first and second bit holding spaces 40 and 42. In various embodiments, the bit holding cavity 30 may be open on one or more end and thus may include one or more passages. In various embodiments, the body 20 may be made of a strong rigid material, such as, for example, plastic, steel, aluminium, alloyed aluminium, injection moulded plastic, and/or another strong rigid material.

Figure 9:
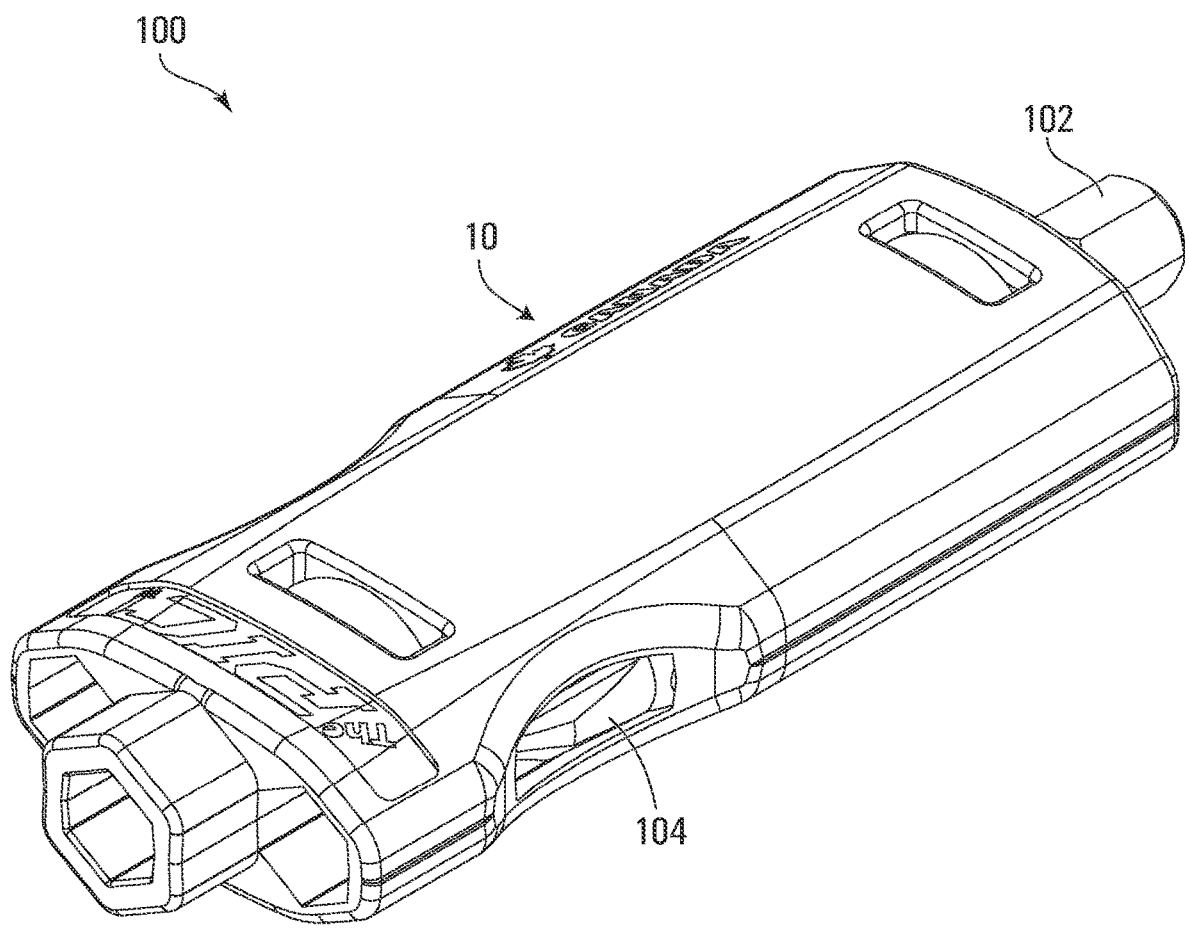
FIG. 9 is a perspective view of a system including the apparatus shown in FIG. 1 according to various embodiments.
Figure 10:
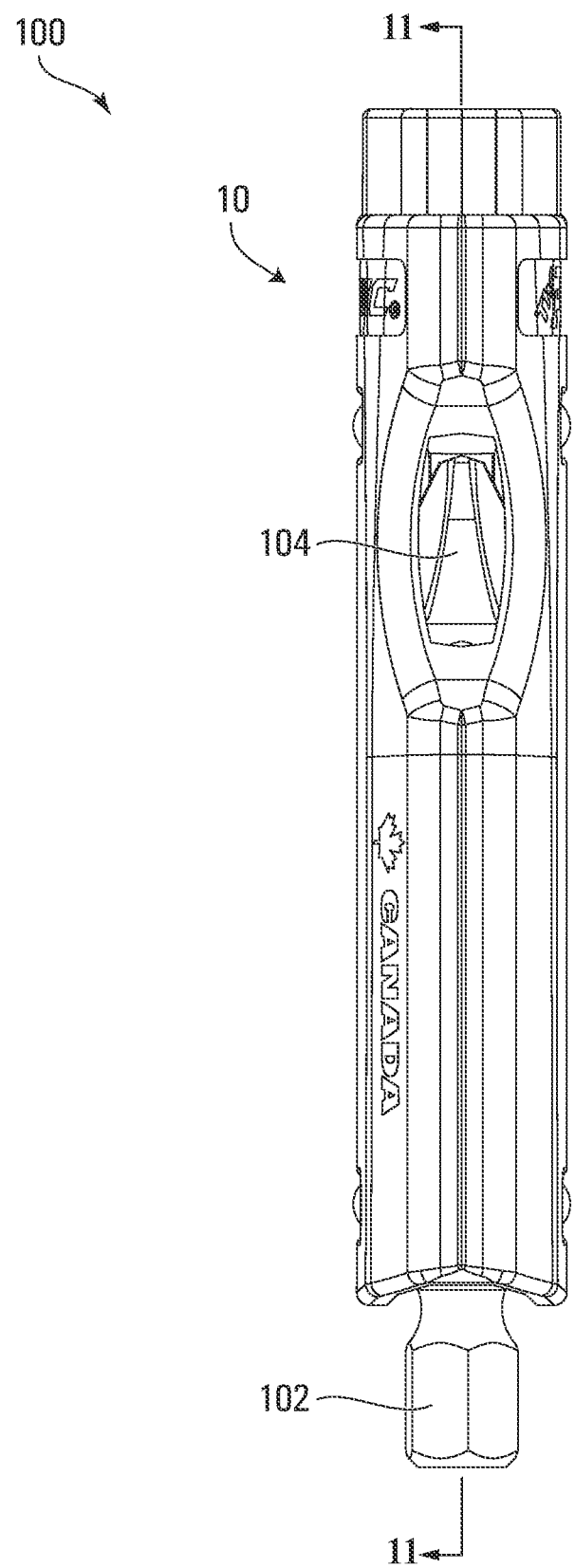
FIG. 10 is a side view of the system shown in FIG. 9 according to various embodiments.

Referring to FIGS. 9 and 10 there is shown a system 100 in a first holding configuration or storage mode including the apparatus 10 and first, second, and third interchangeable tool bits 102, 104, and 106 (shown in FIG. 11, for example) held by the apparatus 10, in accordance with various embodiments. Referring to the side view shown in FIG. 10, there is shown at 11, a depiction of a cross-section from which a top sectional view shown in FIG. 11 of the system 100 is taken, according to various embodiments.

Referring to FIGS. 7 and 8, the apparatus 10 includes a first resiliently deformable bit holder 50 coupled to the body 20. In various embodiments, the first resiliently deformable bit holder 50 may be held in the bit holding cavity 30. In various embodiments, the first resiliently deformable bit holder 50 may separate the first and second bit holding spaces 40 and 42. In various embodiments, the first bit holding space 40 may be adjacent to and encircled or surrounded by an inner surface region 52 of the first resiliently deformable bit holder 50 and the second bit holding space 42 may be adjacent to a first outer surface region 54 of the first resiliently deformable bit holder 50, such that the inner surface region 52 and the first outer surface region 54 of the first resiliently deformable bit holder are configured to deform against the first and second interchangeable tool bits 102 and 104 respectively (shown in FIG. 11, for example), to hold the first and second interchangeable tool bits 102 and 104 when the first and second interchangeable tool bits are in the first and second bit holding spaces 40 and 42.

In some embodiments, the first and second bit holding spaces 40 and 42 may include respective bit holding passages configured to receive the first and second interchangeable tool bits 102 and 104 by sliding them axially while constraining them in other directions.

In various embodiments, the first resiliently deformable bit holder 50 being adjacent to and separating the first and second bit holding spaces 40 and 42 may facilitate its use in holding both the first and second interchangeable tool bits 102 and 104. In various embodiments, the first resiliently deformable bit holder 50 may form a ring or loop, such that the inner surface region 52 encircles or surrounds an opening in the first resiliently deformable bit holder. In various embodiments, using the first resiliently deformable bit holder 50 to hold a bit both at the inner surface region 52 and the first outer surface region 54 may facilitate efficient use of the first resiliently deformable bit holder and/or efficient use of space within the apparatus 10.

In some embodiments, the first resiliently deformable bit holder 50 may be hollow, having an opening therethrough, such that the first resiliently deformable bit holder 50 has the inner surface region 52 configured to encircle the first bit holding space 40. In some embodiments, the first resiliently deformable bit holder 50 may be generally circular but in some embodiments may include another shape, such as, for example, a polygon shape or another non-circular shape. In some embodiments, the first resiliently deformable bit holder 50 may include an o-ring. In various embodiments, use of an o-ring as the first resiliently deformable bit holder 50 may facilitate resilience and deformability in holding the interchangeable tool bits, ease of manufacturing, and/or reduced costs in manufacturing. In some embodiments, the first resiliently deformable bit holder 50 may be made of a resiliently deformable material, such as, for example, rubber, polyurethane, another elastomer, or another resiliently deformable material. In various embodiments, the o-ring acting as the first resiliently deformable bit holder 50 may have an inner diameter of 0.234" and an outer diameter of 0.512", for example.

Figure 11:
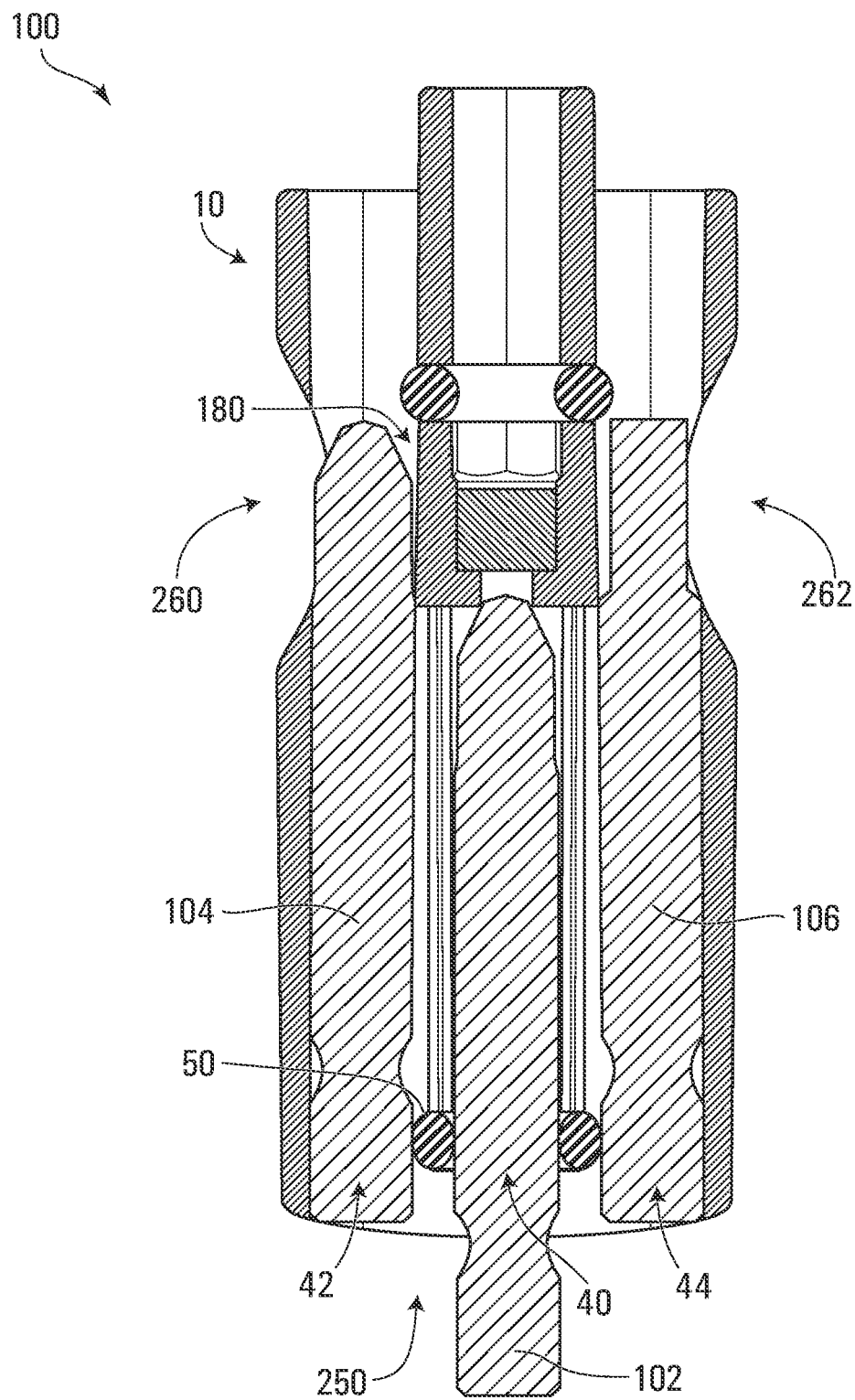
FIG. 11 is a top sectional view of the system shown in FIG. 9 according to various embodiments.

Referring to FIGS. 7 and 8, in various embodiments, the inner walls of the body 20 may define a third bit holding space 44 configured to receive a third interchangeable tool bit 106 (shown in FIG. 11, for example). In various embodiments, the inner walls of the body 20 may define the bit holding cavity 30 having the first, second, and third bit holding spaces and the first resiliently deformable bit holder 50 may be held in the bit holding cavity 30. In various embodiments, the first resiliently deformable bit holder 50 may separate the first and third bit holding spaces 40 and 44, the third bit holding space adjacent to a second outer surface region 56 of the first resiliently deformable bit holder 50, such that the second outer surface region 56 of the first resiliently deformable bit holder 50 is configured to deform against the third interchangeable tool bit 106 to hold the third interchangeable tool bit 106 in the third bit holding space 44 (as shown in FIG. 11, for example). In various embodiments, including the third bit holding space 44 configured to hold the third interchangeable tool bit 106 (shown in FIG. 11), may provide functionality for holding an additional interchangeable tool bit, which may provide a user with improved choice in tool bits when using the apparatus 10.

Referring to FIGS. 7 and 8, in some embodiments, the second and third bit holding spaces 42 and 44 may be disposed on opposite sides of the first resiliently deformable bit holder 50. In some embodiments, the second and third bit holding spaces 42 and 44 being on opposite sides of the first resiliently deformable bit holder 50, and thus the first and second outer surface regions 54 and 56 disposed on opposite sides of the first resiliently deformable bit holder 50, may facilitate countering forces being applied to the first resiliently deformable bit holder 50 when the second and third interchangeable tool bits 104 and 106 (shown in FIG. 11, for example) engage with the first resiliently deformable bit holder 50, which may facilitate holding of the second and third interchangeable tool bits 104 and 106 in the second and third bit holding spaces 42 and 44. In some embodiments, this may facilitate holding the first resiliently deformable bit holder 50 in the cavity 30 while providing the first bit holding space 40 through the opening in the resiliently deformable bit holder 50.

Figure 2:
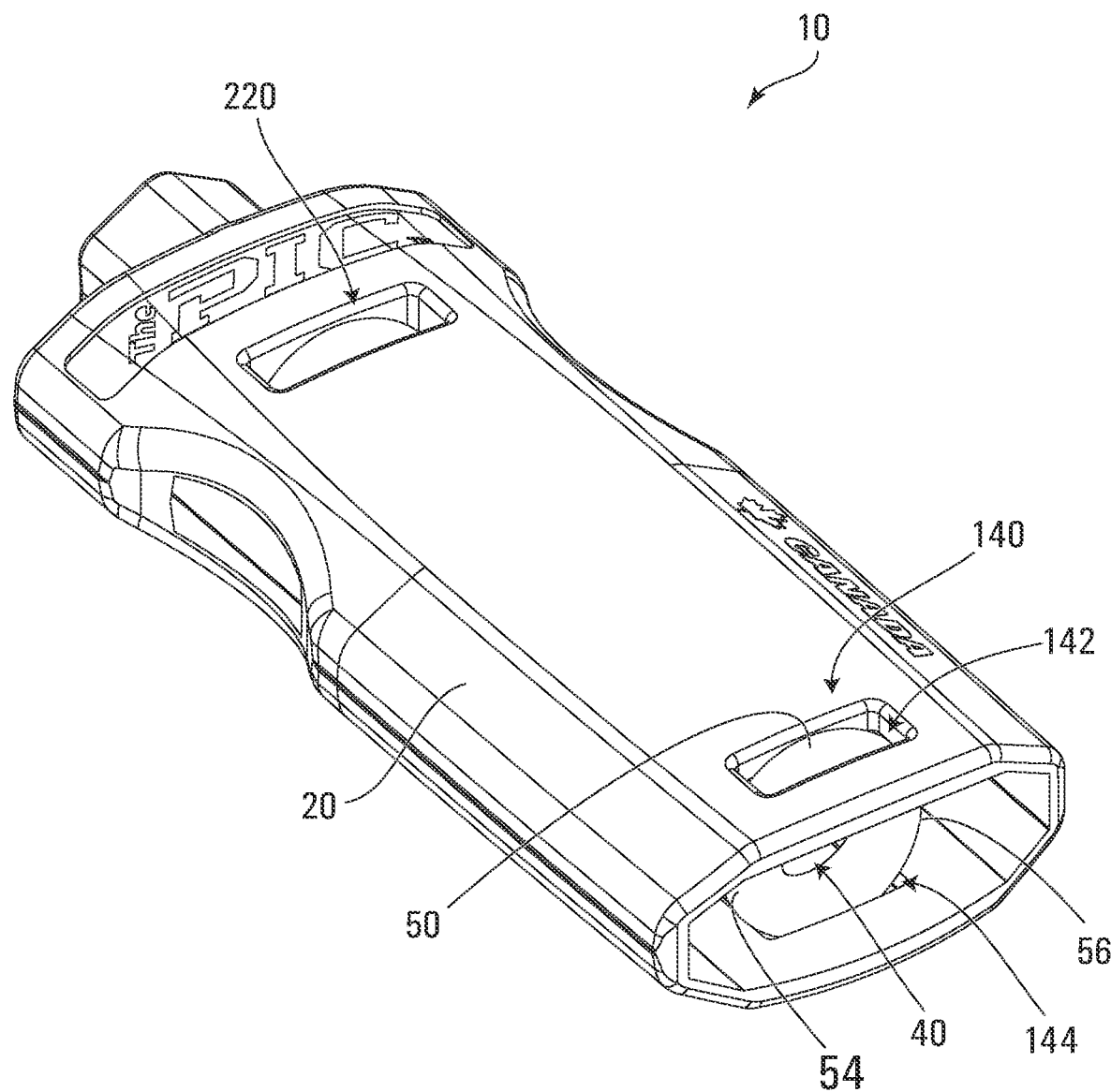
FIG. 2 is a second perspective view of the apparatus shown in FIG. 1 according to various embodiments.
Figure 3:
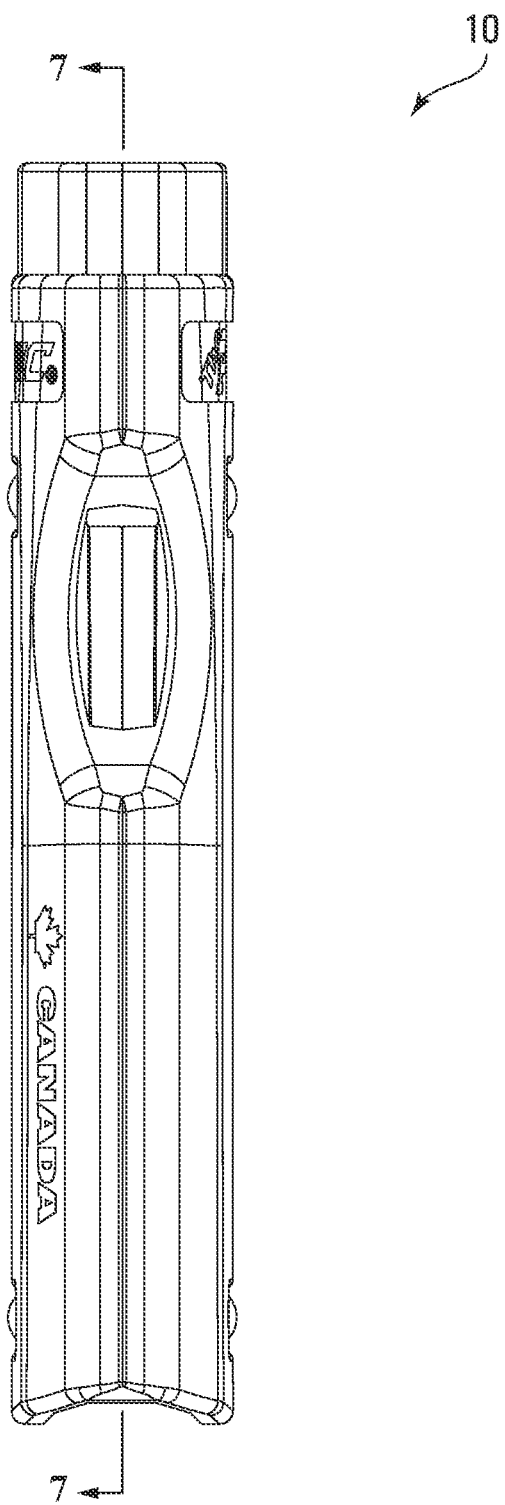
FIG. 3 is a side view of the apparatus shown in FIG. 1 according to various embodiments.
Figure 4:
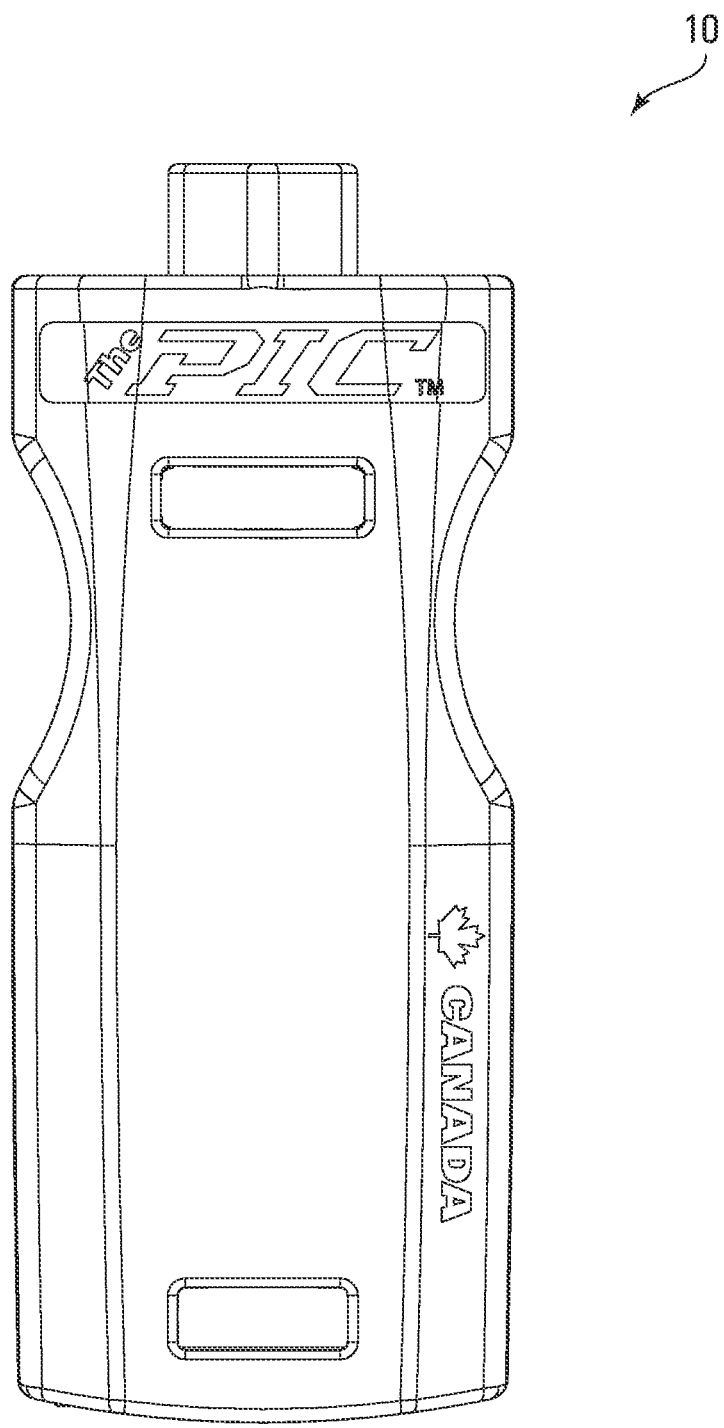
FIG. 4 is a top view of the apparatus shown in FIG. 1 according to various embodiments.
Figure 5:
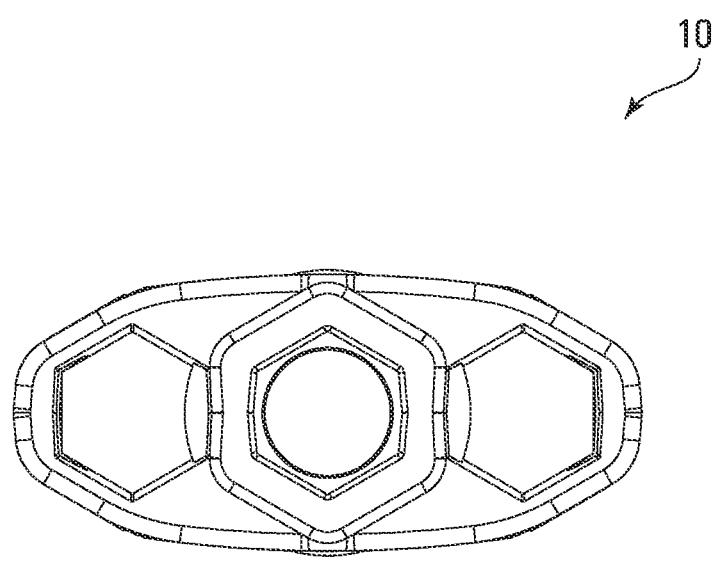
FIG. 5 is a front view of the apparatus shown in FIG. 1 according to various embodiments.
Figure 6:
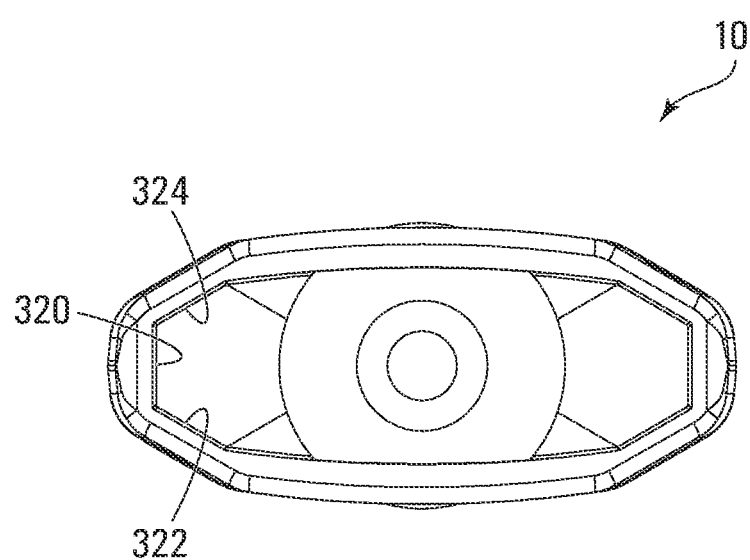
FIG. 6 is a rear view of the apparatus shown in FIG. 1 according to various embodiments.

Referring to FIG. 2, in various embodiments, the apparatus 10 may include a holder mount 140 configured to couple the first resiliently deformable bit holder 50 to the body 20, the holder mount 140 including walls defining a first opening 142 configured to receive and hold a first end of the first resiliently deformable bit holder 50. In various embodiments, the first opening 142 may facilitate ease of loading and holding the first resiliently deformable bit holder 50.

In various embodiments, the holder mount 140 may include a second opening 144 configured to receive and hold a second end of the first resiliently deformable bit holder 50, the second end opposite the first end of the first resiliently deformable bit holder. In various embodiments, the second opening 144 may be generally similar to the first opening 142, but mirrored on the opposite side of the body 20. In various embodiments, including the first and second openings 142 and 144 may facilitate ease of loading and holding the first resiliently deformable bit holder 50. In some embodiments, the first and second openings 142 and 144 may facilitate ease of observing whether the first resiliently deformable bit holder 50 is damaged and/or missing. In some embodiments, the first and second openings 142 and 144 may facilitate provision of the first bit holding space 40 in the first resiliently deformable bit holder 50.

In various embodiments, the first and second ends of the first resiliently deformable bit holder 50 held in the holder mount may be disposed on the first resiliently deformable bit holder 50 generally between the first and second outer regions of the first resiliently deformable bit holder 50. In various embodiments, the first and second openings 142 and 144 may be generally identical (mirror images). In some embodiments, the first and second openings 142 and 144 may each measure 0.382" by 0.142". In various embodiments, the thickness of the first resiliently deformable bit holder 50 may be 0.139" and so the difference between the thickness of the first and second openings 142 and 144 and that of the first resiliently deformable bit holder 50 may be about 0.003". In various embodiments, this difference may facilitate tolerance of manufacturing variability.

In some embodiments, the holder mount 140 may be integral with the body 20. For example, in some embodiments, the holder mount 140 including the first and second openings 142 and 144 may be moulded from a single piece of material with the body 20. In some embodiments, the holder mount and/or the walls defining the first and second openings 142 and 144 being integral with the body 20 may facilitate ease of manufacturing of the apparatus 10.

Referring to FIGS. 7 and 8, in various embodiments, the apparatus 10 may include a driving bit holder 180 configured to receive and hold a driving interchangeable tool bit, such that the driving interchangeable tool bit is driveable by rotation of the body 20 when the driving interchangeable tool bit is held by the driving bit holder. In various embodiments, when the driving interchangeable tool bit is held, the driving interchangeable tool bit and the body 20 may share a rotational axis about which both the body 20 and the driving interchangeable tool bit may be rotated to drive the bit.

Figure 12:
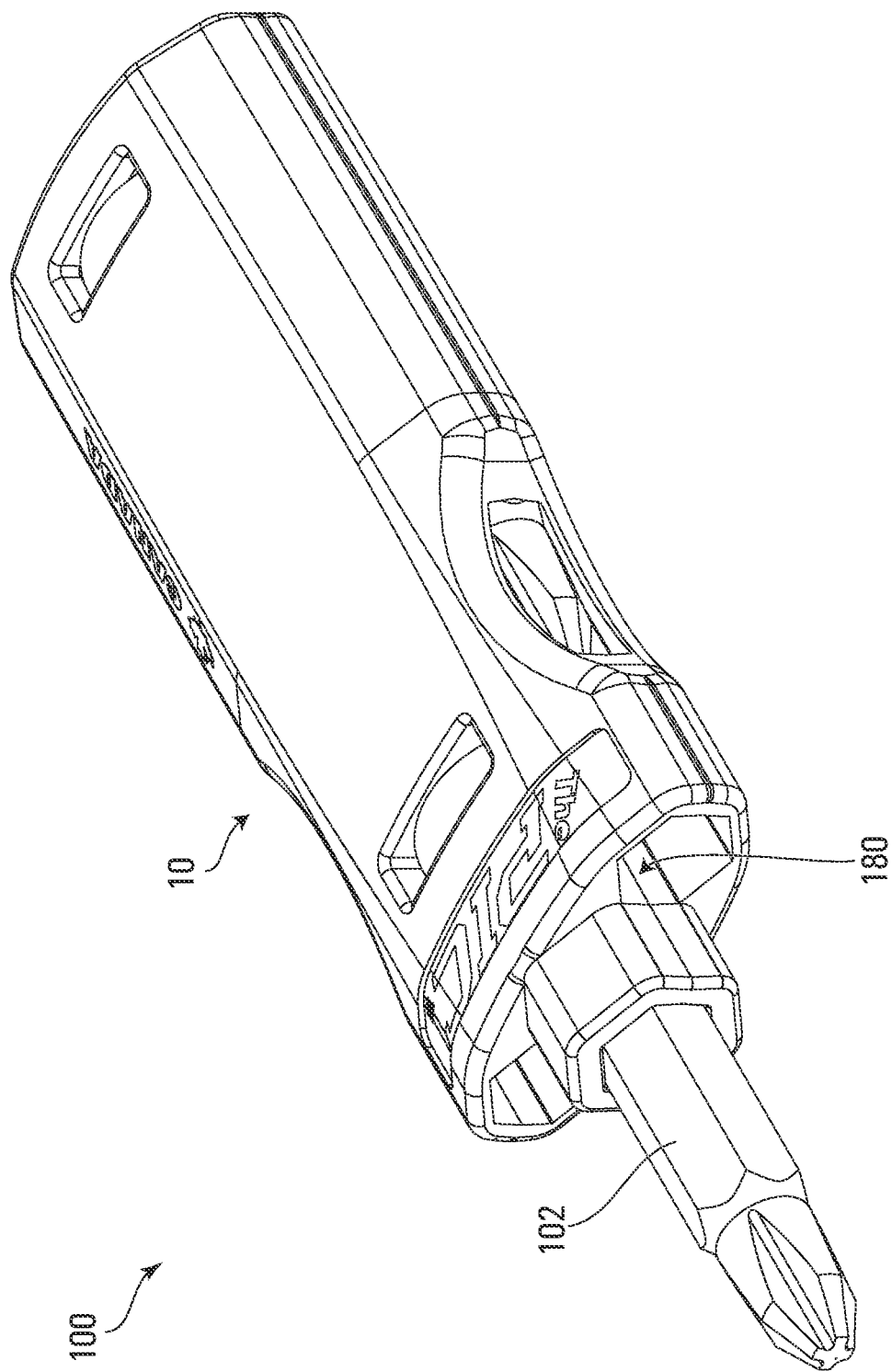
FIG. 12 is a perspective view of a system including the apparatus shown in FIG. 1 according to various embodiments.
Figure 13:
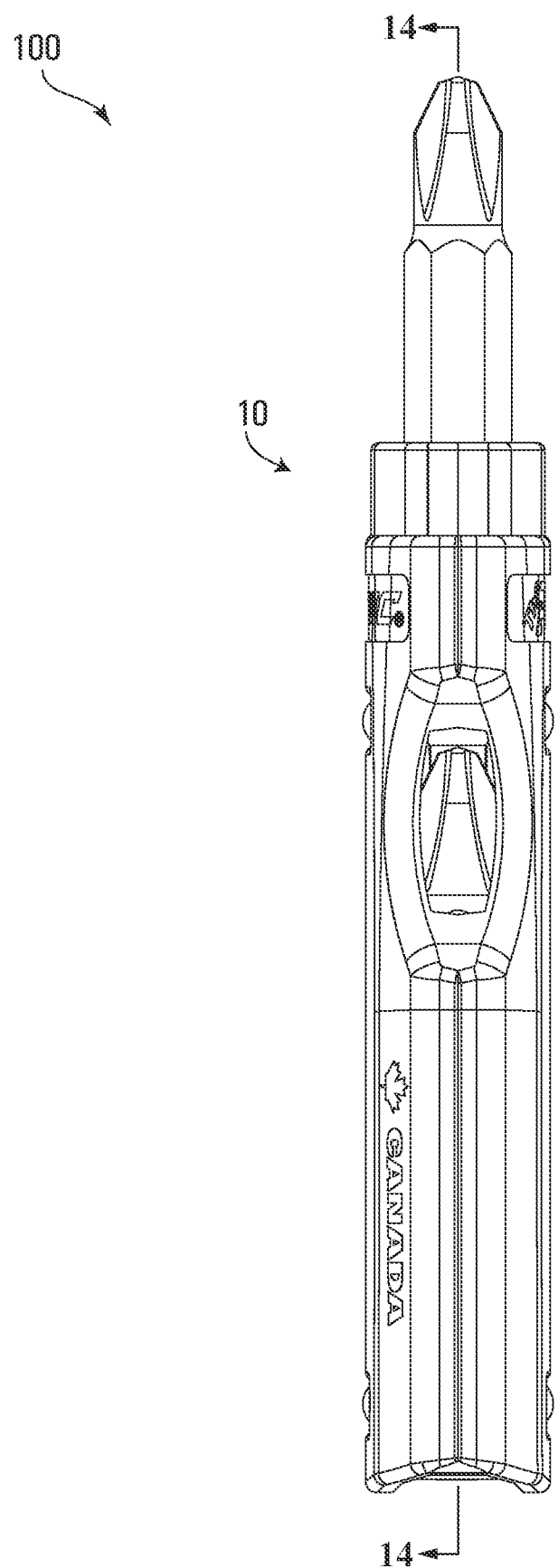
FIG. 13 is a side view of the system shown in FIG. 12 according to various embodiments.
Figure 14:
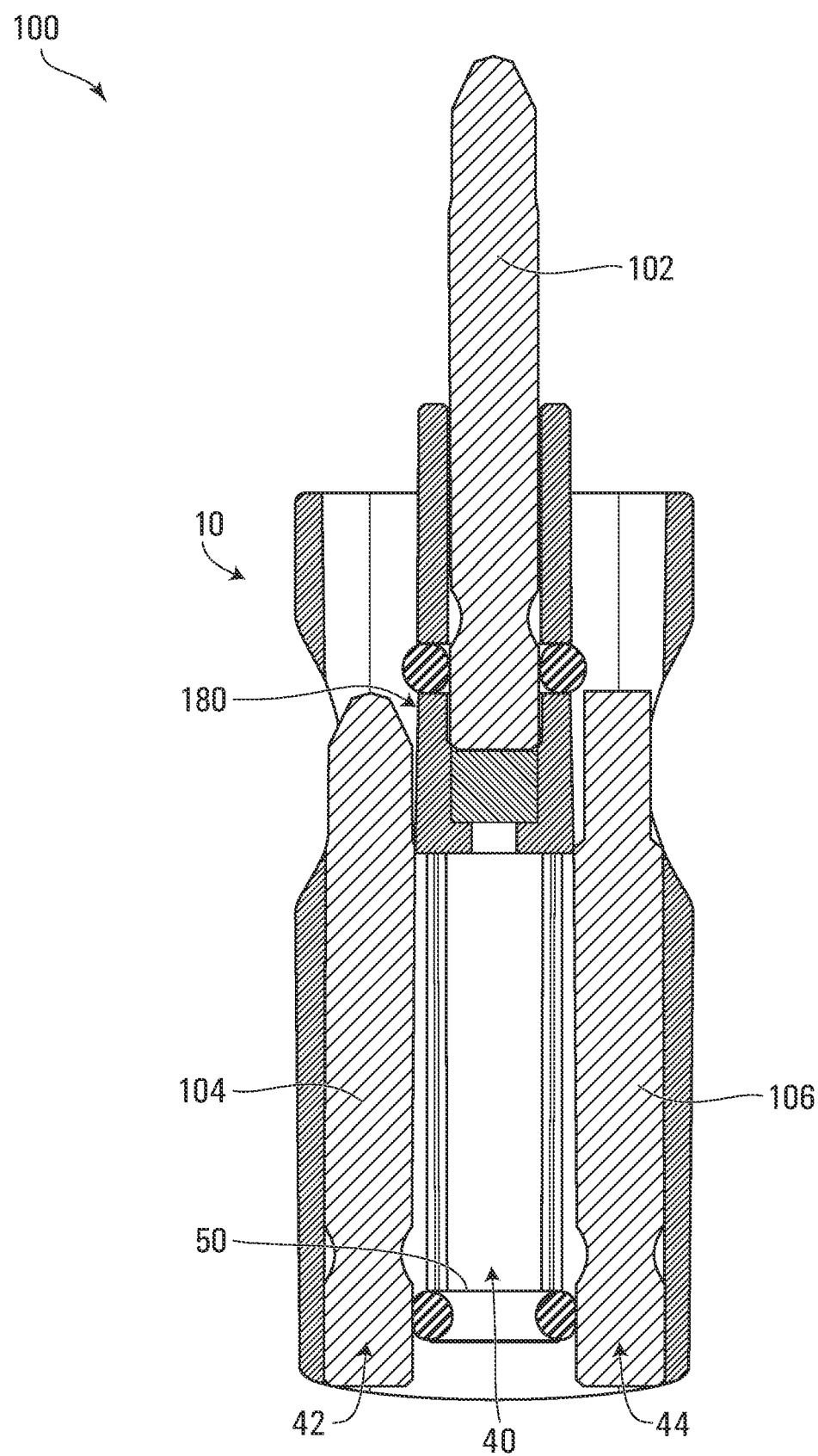
FIG. 14 is a top sectional view of the system shown in FIG. 12 according to various embodiments.

Referring to FIGS. 12 to 14 there is shown the system 100, including the apparatus 10, in a second holding configuration wherein the first interchangeable tool bit 102 is acting as a driving interchangeable tool bit and is held by the driving bit holder 180 of the apparatus 10, in accordance with various embodiments. In some embodiments, the second holding configuration may be referred to as an "in use" mode. Referring to the side view shown in FIG. 13, there is shown at 14, a depiction of a cross-section upon which a top sectional view shown in FIG. 14 of the system 100 is taken, according to various embodiments. Referring to FIG. 14, the system 100 includes the apparatus 10, the first interchangeable tool bit 102 acting as the driving interchangeable tool bit and held by the driving bit holder 180, the second interchangeable tool bit 104 held in the second bit holding space 42, and the third interchangeable tool bit 106 held in the third bit holding space 44.

Referring to FIG. 7, in various embodiments, the driving bit holder 180 may include inner walls that define a driving bit holding space 184, the inner walls configured to hold and rotationally lock the driving interchangeable tool bit in the driving bit holding space 184. For example, in various embodiments, the inner walls defining the driving bit holding space 184 may have a hexagonal cross sectional shape complementary to the outer shape of the interchangeable tool bits used with the apparatus 10. In some embodiments, the driving bit holder 180 may include a second resiliently deformable bit holder 190 configured to deform against and hold the driving interchangeable tool bit when the driving interchangeable tool bit is held by the driving bit holder.

In some embodiments, the second resiliently deformable bit holder 190 may be generally similar to the first resiliently deformable bit holder 50. Referring to FIG. 2, in some embodiments, the driving bit holder 180 may include a holder mount 220 generally similar to the holder mount 140 for holding the second resiliently deformable bit holder 190. In various embodiments, the body 20 may be moulded in one piece which includes the body 20, the holder mount 140, and the holder mount 220. In various embodiments, the first and second resiliently deformable bit holders 50 and 190 have generally similar dimensions. For example, in some embodiments, the first and second resiliently deformable bit holders 50 and 190 may be o-rings having generally the same inner and outer diameter. Accordingly, in various embodiments, the first and second resiliently deformable bit holders 50 and 190 may be interchangeable and this may facilitate ease of manufacturing and/or reduced production costs.

Referring to FIG. 7, in various embodiments, the driving bit holding space 184 may be generally axially aligned with the first bit holding space 40. In various embodiments, this may facilitate alignment of the driving interchangeable tool bit and an interchangeable tool bit held in the first bit holding space 40. In various embodiments, aligning the driving bit holding space and the first bit holding space may facilitate efficient use of space, symmetry for driving and holding bits, and/or compact design of the apparatus 10.

Referring to FIG. 7, in various embodiments, the driving bit holder may include a magnet 230 disposed between the driving bit holding space 184 and the first bit holding space 40. In various embodiments, the magnet 230 may be disposed near a base end of the driving bit holding space 184. In various embodiments, the magnet 230 may be configured to attract and axially hold the driving interchangeable tool bit when the driving interchangeable tool bit is in the driving bit holding space 184. In various embodiments, the magnet 230 may be held in the body 20 using a press fit.

In various embodiments, the second resiliently deformable bit holder 190 may function generally similar to the first resiliently deformable bit holder by providing holding functionality for more than one interchangeable tool bit. Referring to FIG. 7, in various embodiments, the driving bit holding space 184 may be adjacent to and encircled or surrounded by an inner surface region 192 of the second resiliently deformable bit holder 190 and the inner walls of the body 20 may define a transition bit holding space 200 extending from the second bit holding space 42, the transition bit holding space 200 adjacent to an outer surface region 194 of the second resiliently deformable bit holder 190, such that the inner surface region 192 and the outer surface region 194 of the second resiliently deformable bit holder 190 are configured to deform against the driving interchangeable tool bit and a transition interchangeable tool bit respectively, to hold the driving interchangeable tool bit and the transition interchangeable tool bit when the driving interchangeable tool bit and the transition interchangeable tool bit are in the driving bit holding space 184 and the transition bit holding space 200 respectively.

In various embodiments, in operation, a user may take an empty configuration of the apparatus 10 as shown in FIG. 2, for example, and insert the first, second, and third interchangeable tool bits 102, 104, and 106 into the first, second, and third bit holding spaces 40, 42, and 44 respectively, to produce the system 100 in the first holding configuration as shown in FIGS. 9-11. To insert the first, second, and third interchangeable tool bits 102, 104, and 106, the user may push the bits into the first, second, and third bit holding spaces 40, 42 and 44 from a bit entry end 250 of the apparatus 10, to cause the bits to deform the first resiliently deformable bit holder 50 as shown in FIG. 11. In the first holding configuration, the system 100 shown in FIGS. 9-11 may be put away or transported for later use. For example, in some embodiments, in the first holding configuration, a user may wish to carry the system 100 in their pocket. In the first holding configuration, sharp and/or working edges of the first, second, and third interchangeable tool bits 102, 104, and 106 may be safely stored and/or protected within the body 20 of the apparatus 10.

In various embodiments, when the user wishes to use one of the first, second, and third interchangeable tool bits 102, 104, and 106 shown in FIG. 11 or another interchangeable tool bit, the user may insert the bit into the driving bit holder 180 to form the system 100 in the second holding configuration shown in FIGS. 12-14, for example. Referring to FIGS. 11 and 14, in various embodiments, the user may remove the first interchangeable tool bit 102 from the first bit holding space 40 and may insert the first interchangeable tool bit 102 into the driving bit holder 180 to reach the second holding configuration shown in FIGS. 12-14. In various embodiments, to remove the first interchangeable tool bit 102, the user may simply pull the bit from the bit entry end 250 of the apparatus 10. In various embodiments, the second holding configuration may act as a driving configuration wherein a user may drive the first interchangeable tool bit 102 with the apparatus 10.

Figure 15:
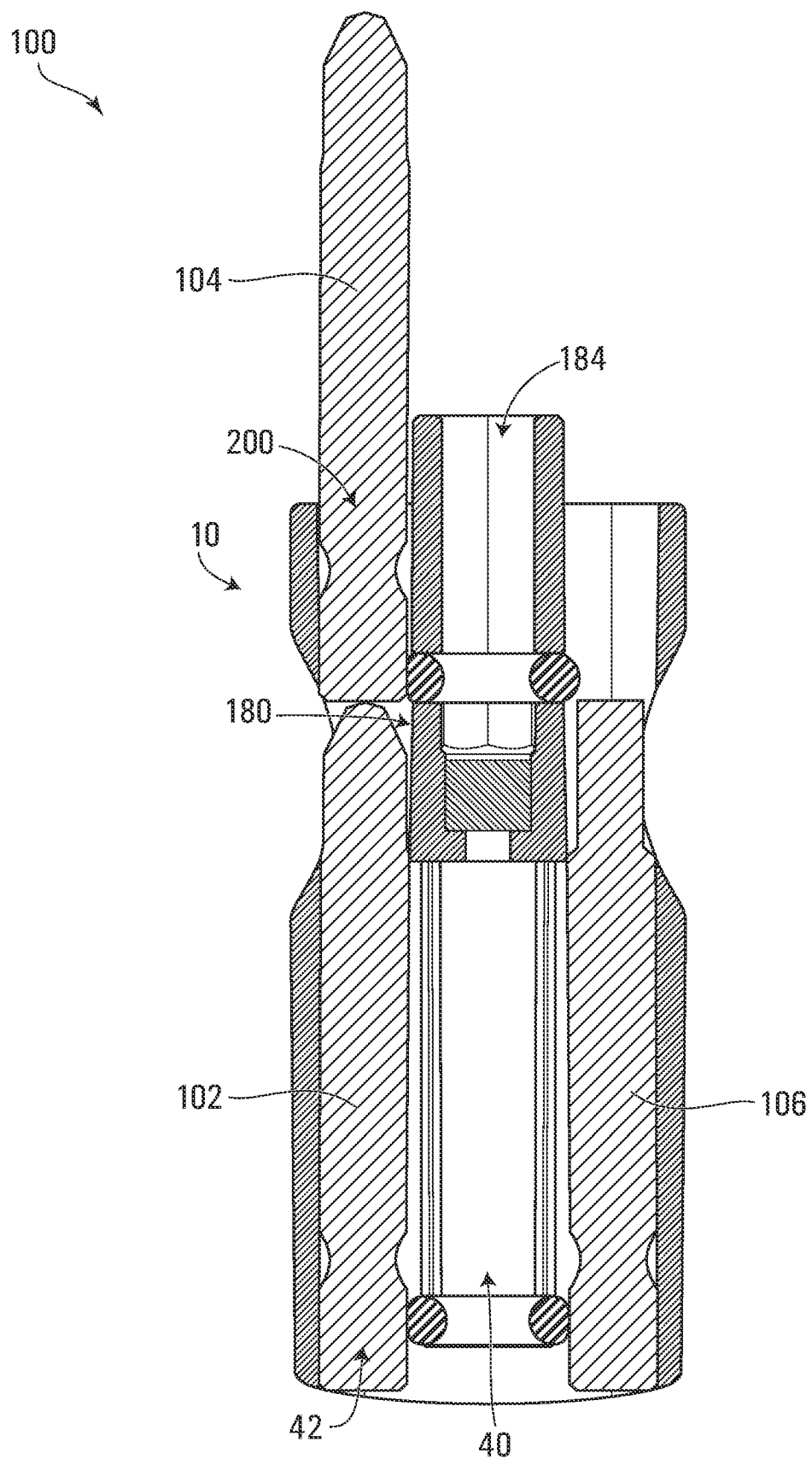
FIG. 15 is a top sectional view of system including the apparatus shown in FIG. 1 according to various embodiments.

In some embodiments, a user may wish to insert the second interchangeable tool bit 104 (or the third interchangeable tool bit 106) into the driving bit holder 180 for use. In some embodiments, the user may be able to see what kind of bits the second and third interchangeable tool bits 104 and 106 are by viewing the second and third interchangeable tool bits 104 and 106 through openings 260 and 262 in the body 20 shown in FIG. 11. In various embodiments, if the user wishes to use the second interchangeable tool bit 104, the user may push from the bit entry end 250 of the apparatus 10, the second interchangeable tool bit 104 using the first interchangeable tool bit 102 (or another interchangeable tool bit, for example). In various embodiments, this may force the second interchangeable tool bit 104 out of engagement with the first resiliently deformable bit holder 50 and into engagement with the second resiliently deformable bit holder 190. In various embodiments, when the first interchangeable tool bit 102 has been inserted into second bit holding space 42, the second interchangeable tool bit 104 may be held in the transition bit holding space 200 adjacent to the second resiliently deformable bit holder 190 and also partially extending out of the body 20. In various embodiments, this may act as a third holding configuration of the system 100 as shown in a sectional view shown in FIG. 15. In various embodiments, the user may then pull the second interchangeable tool bit 104 from the transition bit holding space 200 and insert the second interchangeable tool bit 104 into the driving bit holder 180 for use. In various embodiments, the second resiliently deformable bit holder 190 being configured to hold the second interchangeable tool bit 104 in the transition bit holding space 200 during this process may facilitate reduced risk of dropping the second interchangeable tool bit 104.

Referring back to FIGS. 7 and 8, in various embodiments, the apparatus 10 may include a first bit holding space retainer 300 between the first and second bit holding spaces 40 and 42. In various embodiments, the first bit holding space retainer 300 may be configured to retain the first interchangeable tool bit 102 (shown in FIG. 11, for example) in the first bit holding space 40 and to retain the second interchangeable tool bit 104 (shown in FIG. 11, for example) in the second bit holding space 42. In some embodiments, the apparatus 10 may include a second bit holding space retainer 302 between the second and third bit holding spaces 40 and 44. In some embodiments, the first and second bit holding space retainers 300 and 302 may include ridges on the inner surfaces defining the cavity 30. In some embodiments, the first and second bit holding space retainers 300 and 302 may be configured to engage the first resiliently deformable bit holder 50 to retain the first resiliently deformable bit holder 50 in the holder mount 140 (shown in FIG. 2, for example), for example, by providing forward and rearward support for the first resiliently deformable bit holder 50. In some embodiments, the apparatus 10 may include third and fourth bit holding space retainers generally similar to the first and second bit holding space retainers 300 and 302 but disposed opposite (mirrored over the section plane 7 shown in FIG. 3) and spaced apart from the first and second bit holding space retainers 300 and 302 in the cavity 30.

Referring to FIGS. 7 and 8, in various embodiments, the inner walls of the body 20 may include a first planar wall or surface 320 adjacent to the second bit holding space 42, the first planar wall configured to engage and align with a first flat side of the second interchangeable tool bit 104 (shown in FIG. 11, for example) when the second interchangeable tool bit is in the second bit holding space 42. In various embodiments, the first planar wall 320 may be opposite the first outer surface region 54 of the first resiliently deformable bit holder 50 across the second bit holding space 42. In various embodiments, the first planar wall 320 may, in conjunction with urging from the first resiliently deformable bit holder 50, cause the second interchangeable tool bit 104 (shown in FIG. 11, for example) to rotate into an orientation wherein the first flat side of the second interchangeable tool bit 104 abuts and aligns with the first planar wall 320 such that an opposite second flat side of the second interchangeable tool bit 104 is facing and engages the first outer surface region 54 of the first resiliently deformable bit holder 50. In various embodiments, this may facilitate consistent holding forces and/or friction from the first resiliently deformable bit holder 50 in holding the second interchangeable tool bit 104 by accommodating a consistent width dimension of the second interchangeable tool bit across the first and second flat sides. In various embodiments, this consistent alignment may be particularly desirable in the apparatus 10 where a first interchangeable tool bit 102 may be held in the first bit holding space 40 of the apparatus 10 and thus tolerances may be reduced.

In various embodiments, this may facilitate predictable equality of the friction and force applied to the interchangeable tool bits. In some embodiments, this may facilitate high friction because the first resiliently deformable bit holder 50 may bear against flat sides which may allow more contact than if the first resiliently deformable bit holder 50 were to bear against a point or edge of the bit. In various embodiments, this flat to flat to flat orientation of the interchangeable tool bits may facilitate reduced width of the apparatus 10.

In some embodiments, the inner walls of the body 20 may include second and third planar walls 322 and 324 (shown in FIG. 6, for example) adjacent to the second bit holding space 42, each of the second and third planar walls extending from the first planar wall 320 at an angle of about 120 degrees. In various embodiments, the second and third planar walls 322 and 324 may facilitate consistent rotational orientation of the second interchangeable tool bit 104 in the second bit holding space 42.

In various embodiments, the inner walls of the body 20 may include walls having generally similar features (but mirrored) adjacent to the third bit holding space 44.

In various embodiments, the apparatus 10 may be configured to be used with any tool bit, such as, for example, any type of screwdriver bit including but not limited to: ¼" hex body bits, Phillips bits, Robertson bits (square drive), slotted bits, torx bits, hex key bits, pozidriv bits, spanner bits, clutch, other screw driver bits, coloured pencil bits, hex-mounted drill bits, and/or another tool bit.

In various embodiments, an apparatus generally similar to the apparatus 10 described herein and shown in FIGS. 1-15 may include additional bit holding spaces for holding further interchangeable tool bits. For example, in some embodiments, the apparatus may include bit holding spaces surrounding a resiliently deformable bit holder such that further interchangeable tool bits may engage with and/or deform the resiliently deformable bit holder and be held by the resiliently deformable bit holder. For example, in some embodiments, the apparatus may include 3, 4, 5, 6, 7, 8 or another number of bit holding spaces surrounding a resiliently deformable bit holder.

In various embodiments, the first resiliently deformable bit holder 50 may include a circular or non-circular ring, such that a cross-section of the inner or outer surfaces of the first resiliently deformable bit holder 50 forms a circular or non-circular shape, such as, an oval, an ellipse, a triangle, square, pentagon, hexagon, octagon, a different polygon, or another shape, for example.

In various embodiments, the body 20 of the apparatus 10 described herein and shown in FIGS. 1-15 may be made of a single integral part or distinct parts that are coupled together to form the inner walls defining the bit holding spaces.

In various embodiments, an apparatus generally similar to the apparatus 10 shown in FIGS. 1-15 may be generally similar to the apparatus 10 but without the magnet 230. In various embodiments, a magnet mount or opening for holding the magnet 230 may have a smaller diameter than that of the interchangeable tool bits and so the bits may be held (stopped from rearward travel) at the same location in the driving bit holding space 184 regardless of the presence of the magnet 230. In various embodiments, this may facilitate reduced manufacturing complication and cost and may facilitate the apparatus 10 being used in applications where a user may specifically prefer a non-magnetic version.

Figure 16:
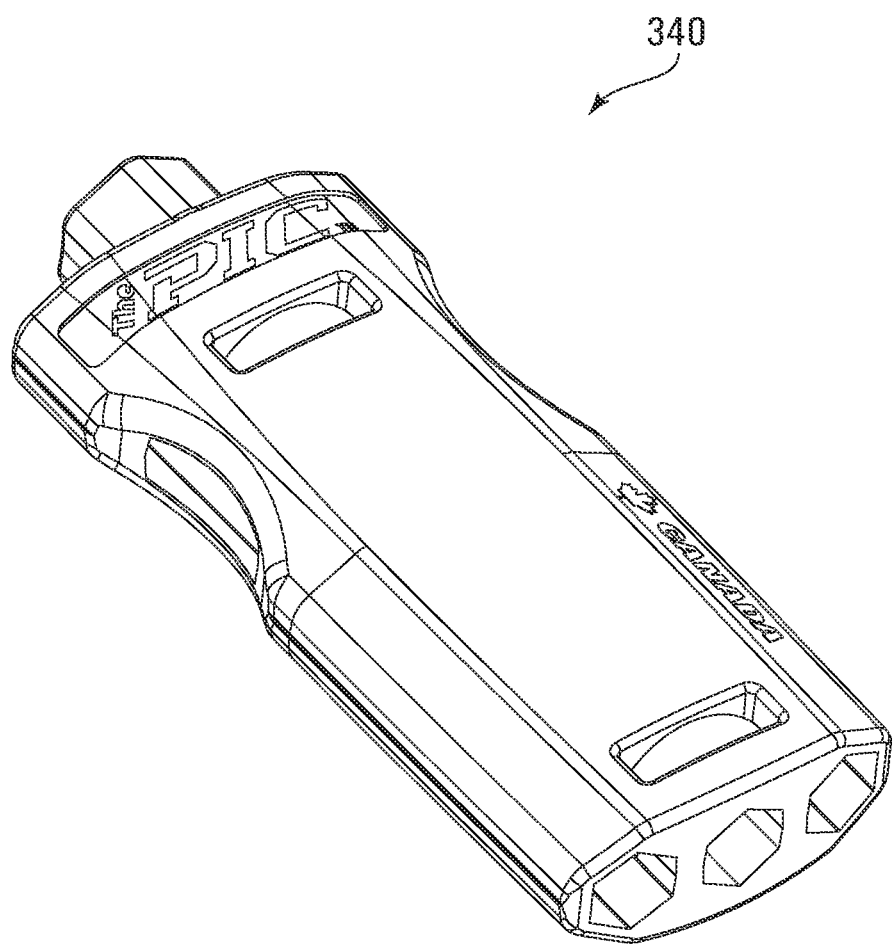
FIG. 16 is a perspective view of an apparatus for holding interchangeable tool bits according to various embodiments.
Figure 17:
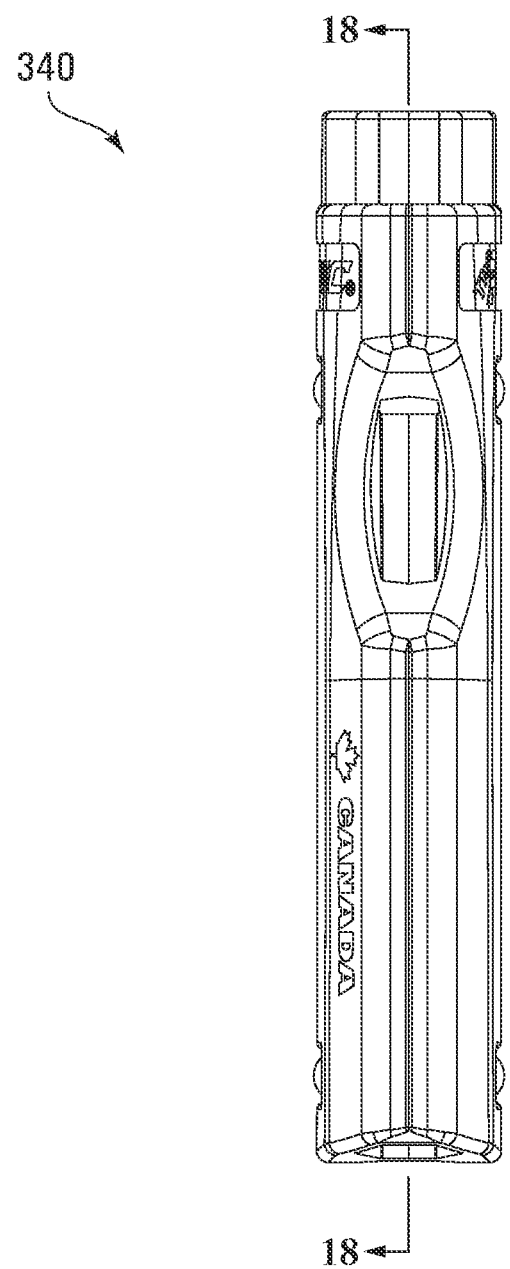
FIG. 17 is a side view of the apparatus shown in FIG. 16 according to various embodiments.
Figure 18:
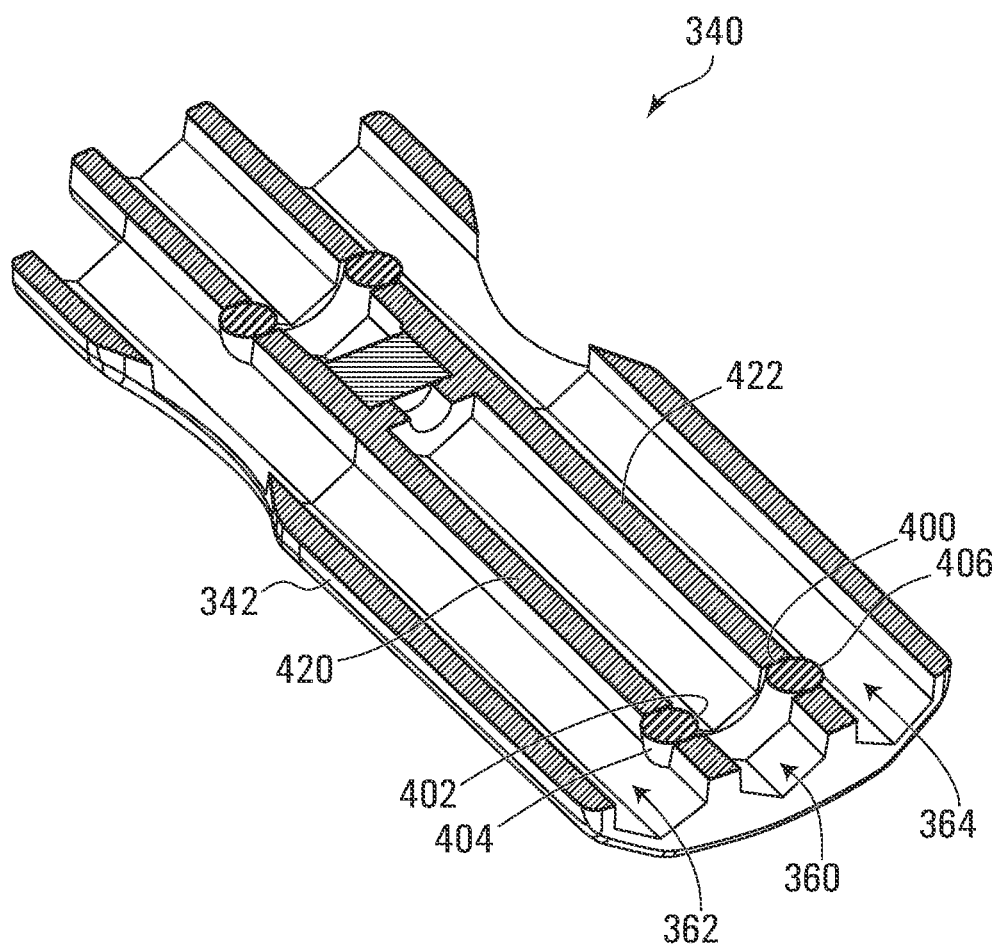
FIG. 18 is a top sectional view of the system shown in FIG. 16 according to various embodiments.

Referring to FIGS. 16, 17, and 18, there are shown drawings depicting an apparatus 340 for holding interchangeable tool bits according to various embodiments, the apparatus 340 including some elements generally similar to the apparatus 10 shown in FIGS. 1-15. Referring to FIG. 18, there is shown a perspective sectional view of the apparatus 340. Referring to FIG. 18, the apparatus 340 includes a body 342 including inner walls defining first and second bit holding spaces 360 and 362 configured to receive first and second interchangeable tool bits. In various embodiments, the apparatus 340 includes a first resiliently deformable bit holder 400 coupled to the body 342 and separating the first and second bit holding spaces 360 and 362, the first bit holding space 360 adjacent to and encircled by an inner surface region 402 of the first resiliently deformable bit holder 400 and the second bit holding space 362 adjacent to a first outer surface region 404 of the first resiliently deformable bit holder 400, such that the inner surface region 402 and the first outer surface region 404 of the first resiliently deformable bit holder 400 are configured to deform against the first and second interchangeable tool bits respectively, to hold the first and second interchangeable tool bits when the first and second interchangeable tool bits are in the first and second bit holding spaces 360 and 362.

In various embodiments, the inner walls of the body 342 may define a third bit holding space 364 configured to receive a third interchangeable tool bit and the first resiliently deformable bit holder 400 may separate the first and third bit holding spaces 360 and 364, the third bit holding space 364 adjacent to a second outer surface region 406 of the first resiliently deformable bit holder 400, such that the second outer surface region 406 of the first resiliently deformable bit holder 400 is configured to deform against the third interchangeable tool bit to hold the third interchangeable tool bit in the third bit holding space 364.

Referring still to FIG. 18, in various embodiments, the apparatus 340 may include first and second bit holding space retainers 420 and 422 configured to separate the first and second bit holding spaces 360 and 362 and the first and third bit holding spaces 360 and 364.

While specific embodiments of the present disclosure have been described and illustrated, such embodiments should be considered illustrative of the present disclosure only and not as limiting the present disclosure as construed in accordance with the accompanying claims.

Illustrative Combinations and Additional Examples

This section describes additional aspects and features of apparatuses for holding interchangeable tool bits, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. An apparatus for holding interchangeable tool bits comprising: a body including inner walls defining first and second bit holding spaces configured to receive first and second interchangeable tool bits; and a resiliently deformable bit holder coupled to the body and separating the first and second bit holding spaces, the first bit holding space adjacent to and encircled by an inner surface region of the resiliently deformable bit holder and the second bit holding space adjacent to an outer surface region of the resiliently deformable bit holder, such that the inner surface region and the outer surface region of the resiliently deformable bit holder are configured to deform against the first and second interchangeable tool bits respectively, to hold the first and second interchangeable tool bits when the first and second interchangeable tool bits are in the first and second bit holding spaces.

A1. The apparatus of paragraph A0 wherein the inner walls of the body include at least one planar wall adjacent to the second bit holding space, the at least one planar wall configured to engage and align with at least one flat side of the second interchangeable tool bit when the second interchangeable tool bit is in the second bit holding space.

A2. The apparatus of paragraph A1 wherein the at least one planar wall includes a first planar wall opposite the outer surface region of the resiliently deformable bit holder across the second bit holding space.

A3. The apparatus of paragraph A2 wherein the at least one planar wall includes second and third generally planar walls adjacent to the second bit holding space, each of the second and third generally planar walls extending from the first planar wall at an angle of about 120 degrees.

A4. The apparatus of any one of paragraphs A0 to A3 wherein the inner walls of the body define a bit holding cavity having the first and second bit holding spaces and wherein the resiliently deformable bit holder is held in the bit holding cavity.

A5. The apparatus of any one of paragraphs A0 to A3 wherein: the inner walls of the body define a third bit holding space configured to receive a third interchangeable tool bit; the outer surface region of the resiliently deformable bit holder is a first outer surface region; and the resiliently deformable bit holder separates the first and third bit holding spaces, the third bit holding space adjacent to a second outer surface region of the resiliently deformable bit holder, such that the second outer surface region of the resiliently deformable bit holder is configured to deform against the third interchangeable tool bit to hold the third interchangeable tool bit in the third bit holding space.

A6. The apparatus of paragraph A5 wherein the second and third bit holding spaces are disposed on opposite sides of the resiliently deformable bit holder.

A7. The apparatus of paragraph A5 or A6 wherein the inner walls of the body define a bit holding cavity having the first, second, and third bit holding spaces and wherein the resiliently deformable bit holder is held in the bit holding cavity.

A8. The apparatus of any one of paragraphs A5 to A7 comprising the third interchangeable tool bit held in the third bit holding space.

A9. The apparatus of any one of paragraphs A0 to A8 comprising a holder mount configured to couple the resiliently deformable bit holder to the body, the holder mount including walls defining a first opening configured to receive and hold a first end of the resiliently deformable bit holder.

A10. The apparatus of paragraph A9 wherein the holder mount includes walls defining a second opening configured to receive and hold a second end of the resiliently deformable bit holder, the second end opposite the first end of the resiliently deformable bit holder.

A11. The apparatus of paragraph A9 or A10 wherein the holder mount is integral with the body.

A12. The apparatus of any one of paragraphs A0 to A11 wherein the resiliently deformable bit holder includes an o-ring.

A13. The apparatus of any one of paragraphs A0 to A12 comprising a driving bit holder configured to receive and hold a driving interchangeable tool bit, such that the driving interchangeable tool bit is driveable by rotation of the body when the driving interchangeable tool bit is held by the driving bit holder.

A14. The apparatus of paragraph A13 wherein the resiliently deformable bit holder is a first resiliently deformable bit holder and wherein the driving bit holder includes: inner walls that define a driving bit holding space, the inner walls configured to hold and rotationally lock the driving interchangeable tool bit in the driving bit holding space; and a second resiliently deformable bit holder configured to deform against and hold the driving interchangeable tool bit when the driving interchangeable tool bit is held by the driving bit holder.

A15. The apparatus of paragraph A14 wherein the driving bit holding space is generally axially aligned with the first bit holding space.

A16. The apparatus of paragraph A14 or A15 wherein the driving bit holding space is adjacent to and encircled by an inner surface region of the second resiliently deformable bit holder and the inner walls of the body define a transition bit holding space extending from the second bit holding space, the transition bit holding space adjacent to an outer surface region of the second resiliently deformable bit holder, such that the inner surface region and the outer surface region of the second resiliently deformable bit holder are configured to deform against the driving interchangeable tool bit and a transition interchangeable tool bit respectively, to hold the driving interchangeable tool bit and the transition interchangeable tool bit when the driving interchangeable tool bit and the transition interchangeable tool bit are in the driving bit holding space and the transition bit holding space respectively.

A17. The apparatus of any one of paragraphs A14 to A16 wherein the first and second resiliently deformable bit holders have generally similar dimensions.

A18. The apparatus of any one of paragraphs A13 to A17 comprising the driving interchangeable tool bit held by the driving bit holder.

A19. The apparatus of any one of paragraphs A0 to A18 comprising the first and second interchangeable tool bits held in the first and second bit holding spaces respectively.

The invention claimed is:

1. An apparatus for holding interchangeable tool bits comprising:
a body including inner walls defining first and second bit holding spaces configured to receive first and second interchangeable tool bits; and
a resiliently deformable bit holder coupled to the body and separating the first and second bit holding spaces, the first bit holding space adjacent to and encircled by an inner surface region of the resiliently deformable bit holder and the second bit holding space adjacent to an outer surface region of the resiliently deformable bit holder, such that the inner surface region and the outer surface region of the resiliently deformable bit holder are configured to deform against the first and second interchangeable tool bits respectively, to hold the first and second interchangeable tool bits when the first and second interchangeable tool bits are in the first and second bit holding spaces.

2. The apparatus of claim 1 wherein the inner walls of the body include at least one planar wall adjacent to the second bit holding space, the at least one planar wall configured to engage and align with at least one flat side of the second interchangeable tool bit when the second interchangeable tool bit is in the second bit holding space.

3. The apparatus of claim 2 wherein the at least one planar wall includes a first planar wall opposite the outer surface region of the resiliently deformable bit holder across the second bit holding space.

4. The apparatus of claim 3 wherein the at least one planar wall includes second and third generally planar walls adjacent to the second bit holding space, each of the second and third generally planar walls extending from the first planar wall at an angle of about 120 degrees.

5. The apparatus of claim 1 wherein the inner walls of the body define a bit holding cavity having the first and second bit holding spaces and wherein the resiliently deformable bit holder is held in the bit holding cavity.

6. The apparatus of claim 1 wherein:
the inner walls of the body define a third bit holding space configured to receive a third interchangeable tool bit;
the outer surface region of the resiliently deformable bit holder is a first outer surface region; and
the resiliently deformable bit holder separates the first and third bit holding spaces, the third bit holding space adjacent to a second outer surface region of the resiliently deformable bit holder, such that the second outer surface region of the resiliently deformable bit holder is configured to deform against the third interchangeable tool bit to hold the third interchangeable tool bit in the third bit holding space.

7. The apparatus of claim 6 wherein the second and third bit holding spaces are disposed on opposite sides of the resiliently deformable bit holder.

8. The apparatus of claim 6 wherein the inner walls of the body define a bit holding cavity having the first, second, and third bit holding spaces and wherein the resiliently deformable bit holder is held in the bit holding cavity.

9. The apparatus of claim 6 comprising the third interchangeable tool bit held in the third bit holding space.

10. The apparatus of claim 1 comprising a holder mount configured to couple the resiliently deformable bit holder to the body, the holder mount including walls defining a first opening configured to receive and hold a first end of the resiliently deformable bit holder.

11. The apparatus of claim 10 wherein the holder mount includes walls defining a second opening configured to receive and hold a second end of the resiliently deformable bit holder, the second end opposite the first end of the resiliently deformable bit holder.

12. The apparatus of claim 10 wherein the holder mount is integral with the body.

13. The apparatus of claim 1 wherein the resiliently deformable bit holder includes an o-ring.

14. The apparatus of claim 1 comprising a driving bit holder configured to receive and hold a driving interchangeable tool bit, such that the driving interchangeable tool bit is driveable by rotation of the body when the driving interchangeable tool bit is held by the driving bit holder.

15. The apparatus of claim 14 wherein the resiliently deformable bit holder is a first resiliently deformable bit holder and wherein the driving bit holder includes:
inner walls that define a driving bit holding space, the inner walls configured to hold and rotationally lock the driving interchangeable tool bit in the driving bit holding space; and
a second resiliently deformable bit holder configured to deform against and hold the driving interchangeable tool bit when the driving interchangeable tool bit is held by the driving bit holder.

16. The apparatus of claim 15 wherein the driving bit holding space is generally axially aligned with the first bit holding space.

17. The apparatus of claim 15 wherein the driving bit holding space is adjacent to and encircled by an inner surface region of the second resiliently deformable bit holder and the inner walls of the body define a transition bit holding space extending from the second bit holding space, the transition bit holding space adjacent to an outer surface region of the second resiliently deformable bit holder, such that the inner surface region and the outer surface region of the second resiliently deformable bit holder are configured to deform against the driving interchangeable tool bit and a transition interchangeable tool bit respectively, to hold the driving interchangeable tool bit and the transition interchangeable tool bit when the driving interchangeable tool bit and the transition interchangeable tool bit are in the driving bit holding space and the transition bit holding space respectively.

18. The apparatus of claim 15 wherein the first and second resiliently deformable bit holders have generally similar dimensions.

19. The apparatus of claim 14 comprising the driving interchangeable tool bit held by the driving bit holder.

20. The apparatus of claim 1 comprising the first and second interchangeable tool bits held in the first and second bit holding spaces respectively.

* * * * *